(12) United States Patent
Miyakoshi et al.

(10) Patent No.: US 10,493,821 B2
(45) Date of Patent: Dec. 3, 2019

(54) VEHICLE AIR CONDITIONER

(71) Applicant: SANDEN AUTOMOTIVE CLIMATE SYSTEMS CORPORATION, Isesaki-shi (JP)

(72) Inventors: Ryo Miyakoshi, Isesaki (JP); Kenichi Suzuki, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 116 days.

(21) Appl. No.: 15/572,365

(22) PCT Filed: May 2, 2016

(86) PCT No.: PCT/JP2016/063539
§ 371 (c)(1),
(2) Date: Nov. 7, 2017

(87) PCT Pub. No.: WO2016/194538
PCT Pub. Date: Dec. 8, 2016

(65) Prior Publication Data
US 2018/0141411 A1    May 24, 2018

(30) Foreign Application Priority Data

May 29, 2015 (JP) .................. 2015-109782

(51) Int. Cl.
*B60H 1/20* (2006.01)
*B60H 1/22* (2006.01)
(Continued)

(52) U.S. Cl.
CPC ............. *B60H 1/2209* (2013.01); *B60H 1/20* (2013.01); *B60H 1/2218* (2013.01);
(Continued)

(58) Field of Classification Search
CPC .......... B60H 1/2218; B60H 2001/2231; B60H 2001/2256; B60L 2240/34; F24H 9/2071; F24H 3/0429; F24H 3/0405; F24H 3/04
See application file for complete search history.

(56) References Cited

U.S. PATENT DOCUMENTS 9,036,316 B2 * 5/2015 Satoh ..................... H02H 5/047
180/65.275
2008/0002326 A1 * 1/2008 Watanabe ............ B60H 1/2218
361/103
(Continued)

FOREIGN PATENT DOCUMENTS

| CN | 1139407 | 1/1997 |
|----|---------|--------|
| CN | 102563811 | 7/2012 |

(Continued)

OTHER PUBLICATIONS

Office Action dated Aug. 5, 2019 issued in Chinese Patent Application No. 201680031058.X.

*Primary Examiner* — Filip Zec
(74) *Attorney, Agent, or Firm* — Cozen O'Connor

(57) ABSTRACT

There is disclosed a vehicle air conditioner which is capable of achieving protection of an air flow passage without hindrance, even when a temperature sensor which detects a temperature of an electric heater fails. When a detected value of an electric heater temperature sensor detecting the highest temperature among a plurality of electric heater temperature sensors 61 to 64 is in excess of a predetermined threshold value, a controller executes a protecting operation of limiting energization to the electric heater or stopping the energization. The controller calculates an estimated value Thtrest of the temperature which is calculated back from a consumed power of the electric heater, and when one of the electric heater temperature sensors fails, the controller executes the protecting operation on the basis of the highest (Continued)

value among the detected values of the temperature sensors other than the electric heater temperature sensor and the estimated value.

10 Claims, 6 Drawing Sheets

(51) Int. Cl.
    *B60L 1/00*           (2006.01)
    *H05B 3/00*          (2006.01)
    *F24H 3/04*           (2006.01)
    *F24H 9/20*           (2006.01)
    *H05B 1/02*          (2006.01)
    *B60L 3/00*           (2019.01)

(52) U.S. Cl.
    CPC ............ B60H 1/2225 (2013.01); B60L 1/003 (2013.01); F24H 3/0429 (2013.01); F24H 9/2071 (2013.01); H05B 1/0236 (2013.01); H05B 3/0004 (2013.01); *B60H 2001/2231* (2013.01); *B60H 2001/2256* (2013.01); *B60H 2001/2287* (2013.01); *B60L 3/0046* (2013.01); *B60L 2240/34* (2013.01)

(56) References Cited

U.S. PATENT DOCUMENTS

| | | | | |
|---|---|---|---|---|
| 2013/0168458 | A1* | 7/2013 | Ichishi | B60H 1/004 237/2 A |
| 2015/0122899 | A1* | 5/2015 | Kaneko | H05B 1/0236 236/94 |
| 2015/0158366 | A1* | 6/2015 | Lee | B60H 1/2218 701/36 |
| 2015/0204581 | A1* | 7/2015 | Krystad | F24H 9/2071 219/502 |
| 2016/0200172 | A1* | 7/2016 | Nakashima | B60H 1/2218 237/5 |

FOREIGN PATENT DOCUMENTS

| | | |
|---|---|---|
| CN | 102825992 | 12/2012 |
| JP | 06-68920 | 9/1994 |
| JP | 2002-14732 | 1/2002 |
| JP | 2010-221772 | 10/2010 |
| JP | 2014-19369 | 2/2014 |
| JP | 2014-213765 | 11/2014 |
| JP | 2014-217971 | 11/2014 |

* cited by examiner

VEHICLE AIR CONDITIONER

RELATED APPLICATIONS

This is a U.S. National Phase Application under 35 USC 371 of International Application PCT/JP2016/063539 filed on May 2, 2016.

This application claims the priority of Japanese application no. 2015-109782 filed May 29, 2015, the entire content of which is hereby incorporated by reference.

TECHNICAL FIELD

The present invention relates to a vehicle air conditioner which conditions air of a vehicle interior, and more particularly, it relates to a vehicle air conditioner which heats air to be supplied to the vehicle interior by mainly or auxiliarily using an electric heater.

BACKGROUND ART

Due to actualization of environmental problems in recent years, hybrid cars and electric cars have spread. Further, as an air conditioner which is applicable to such a vehicle, there has been developed an air conditioner which includes a refrigerant circuit constituted of a compressor to compress and discharge a refrigerant, a radiator disposed in an air flow passage of an HVAC unit to let the refrigerant radiate heat, a heat absorber disposed in the air flow passage to let the refrigerant absorb heat, an outdoor heat exchanger disposed outside a vehicle interior to let the refrigerant radiate heat, and others, and which lets the refrigerant discharged from the compressor radiate heat in the radiator to heat the air to be supplied from an indoor blower, thereby heating the vehicle interior (e.g., see Patent Document 1).

Furthermore, in Patent Document 1, the air conditioner has a constitution where an electric heater is provided in the air flow passage to exert a heating capability of the electric heater in addition to that of the radiator. In particular, for the electric car, there is also a constitution where the radiator does not perform such heating (the refrigerant circuit is constituted only for cooling) and the heating is performed only by the electric heater to which power is supplied from a battery.

Here, the HVAC unit including the air flow passage therein is usually formed of a hard resin, and when a temperature of the electric heater abnormally heightens from any cause, there is the risk that the HVAC unit (the air flow passage) is deformed or molten by the heat of the electric heater. To avoid the risk, heretofore, a plurality of temperature sensors have been attached to the electric heater, and there has been provided a protective function of limiting energization of the electric heater and finally stopping the energization, when the temperature (a detected value) of the electric heater which is detected by each temperature sensor abnormally rises.

CITATION LIST

Patent Documents

Patent Document 1: Japanese Patent Application Publication No. 2014-213765

SUMMARY OF THE INVENTION

Problems to be Solved by the Invention

However, there has been the problem that breakage of an HVAC unit (an air flow passage) due to abnormal temperature rise is not avoidable, when a temperature sensor to detect a temperature of an electric heater fails.

The present invention has been developed to solve such a conventional technical problem, and an object thereof is to provide a vehicle air conditioner which is capable of achieving protection of an air flow passage without hindrance, also when temperature sensors to detect a temperature of an electric heater fail.

Means for Solving the Problems

A vehicle air conditioner of the present invention heats, by an electric heater, air to be supplied to a vehicle interior, and includes an air flow passage through which the air to be supplied to the vehicle interior flows, the electric heater disposed in this air flow passage to heat the air to be supplied to the vehicle interior, control means for controlling energization of this electric heater, and a plurality of temperature sensors which detect a temperature of the electric heater, and the vehicle air conditioner is characterized in that when a detected value of the temperature sensor detecting the highest temperature among the plurality of temperature sensors is in excess of a predetermined threshold value, the control means executes a protecting operation of limiting the energization to the electric heater or stopping the energization, and calculates an estimated value of the temperature of the electric heater which is calculated back from a consumed power of the electric heater, and when one of the temperature sensors fails, the control means executes the protecting operation on the basis of the highest value among the detected values of the temperature sensors other than the relevant temperature sensor and the estimated value.

The vehicle air conditioner of the invention of claim 2 is characterized in that in the above invention, the control means executes, in the protecting operation, energization limiting control to limit the energization to the electric heater so that the detected value or the estimated value does not exceed a predetermined first threshold value, and energization stop control to stop the energization to the electric heater when the detected value or the estimated value is in excess of a predetermined second threshold value higher than the first threshold value.

According to the above respective inventions, the vehicle air conditioner of the invention of claim 3 includes a refrigerant circuit having a compressor to compress a refrigerant, a radiator disposed in the air flow passage to let the refrigerant radiate heat and heat the air to be supplied to the vehicle interior, and a heat absorber disposed in the air flow passage on an upstream side of air flowing through the electric heater to let the refrigerant absorb heat and cool the air to be supplied to the vehicle interior, and the vehicle air conditioner is characterized in that when the radiator is disposed on a downstream side of the air flowing through the electric heater, the control means calculates the estimated value on the basis of the consumed power and a temperature of the heat absorber, and when the radiator is disposed on the upstream side of the air flowing through the electric heater, the control means calculates the estimated value on the basis of the consumed power and a temperature of the radiator.

The vehicle air conditioner of the invention of claim 4 is characterized in that in the above respective inventions, during the energization to the electric heater, the control means executes a failure diagnosis operation of comparing the estimated value of the temperature of the electric heater with each of the detected values of the respective temperature sensors, and judging that the temperature sensor in which a difference between the values is outside a predetermined range fails.

The vehicle air conditioner of the invention of claim 5 is characterized in that in the above respective inventions, during the stop of the energization to the electric heater, the control means executes a failure diagnosis operation of comparing a value of a temperature of the air flowing into the electric heater with each of the detected values of the respective temperature sensors, and judging that the temperature sensor in which a difference between the values is outside a predetermined range fails.

The vehicle air conditioner of the invention of claim 6 is characterized in that in the invention of claim 4 or claim 5, in the failure diagnosis operation, the control means confirms variances of the detected values of the respective temperature sensors at a predetermined timing during the stop of the energization to the electric heater, and the control means judges that the respective temperature sensors are normal, when all the detected values are within the predetermined range.

The vehicle air conditioner of the invention of claim 7 is characterized in that in the above respective inventions, when one of the temperature sensors fails, the control means continues the energization to the electric heater as long as the detected values of the temperature sensors other than the relevant temperature sensor and the estimated value are within a predetermined normal range.

The vehicle air conditioner of the invention of claim 8 is characterized in that in the above respective inventions, the control means enables right/left independent air-conditioning control of the vehicle interior, and calculates the estimated values independently on right and left sides by use of a right/left air volume ratio.

The vehicle air conditioner of the invention of claim 9 is characterized in that in the above respective inventions, when one of the temperature sensors fails, the control means decreases the threshold value as much as a predetermined value.

The vehicle air conditioner of the invention of claim 10 is characterized in that in the above respective inventions, when the detected values of the respective temperature sensors indicate about the same value during the stop of the energization to the electric heater and the detected value of one of the temperature sensors indicates a different value with a predetermined difference from the detected values of the other temperature sensors during the energization to the electric heater, the control means judges clogging of the electric heater to stop the energization to the electric heater.

Advantageous Effect of the Invention

According to the present invention, a vehicle air conditioner heats, by an electric heater, air to be supplied to a vehicle interior, and includes an air flow passage through which the air to be supplied to the vehicle interior flows, the electric heater disposed in this air flow passage to heat the air to be supplied to the vehicle interior, control means for controlling energization of this electric heater, and a plurality of temperature sensors which detect a temperature of the electric heater, and in the vehicle air conditioner, when a detected value of the temperature sensor detecting the highest temperature among the plurality of temperature sensors is in excess of a predetermined threshold value, the control means executes a protecting operation of limiting the energization to the electric heater or stopping the energization, and calculates an estimated value of the temperature of the electric heater which is calculated back from a consumed power of the electric heater, and when one of the temperature sensors fails, the control means executes the protecting operation on the basis of the highest value among the detected values of the temperature sensors other than the relevant temperature sensor and the estimated value. Consequently, even in case of the failure of one or a plurality of the temperature sensors from any cause, the control means precisely executes the protecting operation to inhibit abnormal temperature rise of the electric heater, and hence it is possible to effectively prevent breakage of the air flow passage.

In this case, as in the invention of claim 2, the control means executes, in the protecting operation, energization limiting control to limit the energization to the electric heater so that the detected value or the estimated value does not exceed a predetermined first threshold value, and energization stop control to stop the energization to the electric heater when the detected value or the estimated value is in excess of a predetermined second threshold value higher than the first threshold value. Consequently, it is possible to more securely inhibit rapid temperature rise of the electric heater, and it is possible to avoid beforehand the disadvantage that the air flow passage breaks at abnormally high temperature due to overshoot.

Furthermore, as in the invention of claim 3, the vehicle air conditioner includes a refrigerant circuit having a compressor to compress a refrigerant, a radiator disposed in the air flow passage to let the refrigerant radiate heat and heat the air to be supplied to the vehicle interior, and a heat absorber disposed in the air flow passage on an upstream side of air flowing through the electric heater to let the refrigerant absorb heat and cool the air to be supplied to the vehicle interior. In the vehicle air conditioner in which the electric heater is auxiliarily used, when the radiator is disposed on a downstream side of the air flowing through the electric heater, the control means calculates the estimated value on the basis of the consumed power and a temperature of the heat absorber, and when the radiator is disposed on the upstream side of the air flowing through the electric heater, the control means calculates the estimated value on the basis of the consumed power and a temperature of the radiator. Consequently, it is possible to accurately estimate the temperature of the electric heater by utilizing the temperature of the heat absorber or the radiator which indicates the temperature of the air flowing into the electric heater.

According to the invention of claim 4, in the above respective inventions, during the energization to the electric heater, the control means executes a failure diagnosis operation of comparing the estimated value of the temperature of the electric heater with each of the detected values of the respective temperature sensors, and judging that the temperature sensor in which a difference between the values is outside a predetermined range fails, so that it is possible to diagnose, from the detected value of each temperature sensor, whether or not the temperature sensor fails.

Similarly, during the stop of the energization to the electric heater, as in the invention of claim 5, the control means compares a value of a temperature of the air flowing into the electric heater with each of the detected values of the respective temperature sensors, and judges that the temperature sensor in which a difference between the values is outside a predetermined range fails, so that the failure diagnosis of each temperature sensor is achievable. Consequently, in the vehicle air conditioner having the refrigerant circuit as in claim 3, the temperature of the heat absorber or the temperature of the radiator is utilizable as the temperature of the air flowing into the electric heater.

Furthermore, as in the invention of claim 6, in the above failure diagnosis operation, the control means confirms variances of the detected values of the respective temperature sensors at a predetermined timing during the stop of the energization to the electric heater, and the control means judges that the respective temperature sensors are normal, when all the detected values are within the predetermined range. Consequently, it is possible to comparatively easily judge that the plurality of temperature sensors are normal, excluding a case where all the temperature sensors have already failed at a vehicle startup time or the like.

Furthermore, as in the invention of claim 7, when one of the temperature sensors fails, the control means continues the energization to the electric heater as long as the detected values of the temperature sensors other than the relevant temperature sensor and the estimated value are within a predetermined normal range. Consequently, the control means continuously performs air conditioning of the vehicle interior also at the time of the failure of the temperature sensor, and hence it is possible to prevent deterioration of comfort.

In the above inventions, as in the invention of claim 8, when right/left independent air-conditioning control of the vehicle interior is enabled, the control means calculates the estimated values independently on right and left sides by use of a right/left air volume ratio, so that also in the case of performing the air conditioning independently at a driver's seat, a front passenger seat and the like, the above effect is achievable without hindrance.

Furthermore, as in the invention of claim 9, when one of the temperature sensors fails, the control means decreases the threshold value as much as a predetermined value, so that it is possible to execute control in a safer direction in such an abnormal case.

In addition, as in the invention of claim 10, when the detected values of the respective temperature sensors indicate about the same value during the stop of the energization to the electric heater and the detected value of one of the temperature sensors indicates a different value with a predetermined difference from the detected values of the other temperature sensors during the energization to the electric heater, the control means judges clogging of the electric heater to stop the energization to the electric heater. Consequently, the control means also precisely judges the clogging of the electric heater, and hence it is possible to avoid beforehand the disadvantage that the air flow passage breaks due to abnormal temperature rise of the clogged electric heater.

MODE FOR CARRYING OUT THE INVENTION

Hereinafter, description will be made as to embodiments of the present invention in detail with reference to the drawings.

Embodiment 1

Figure 1:
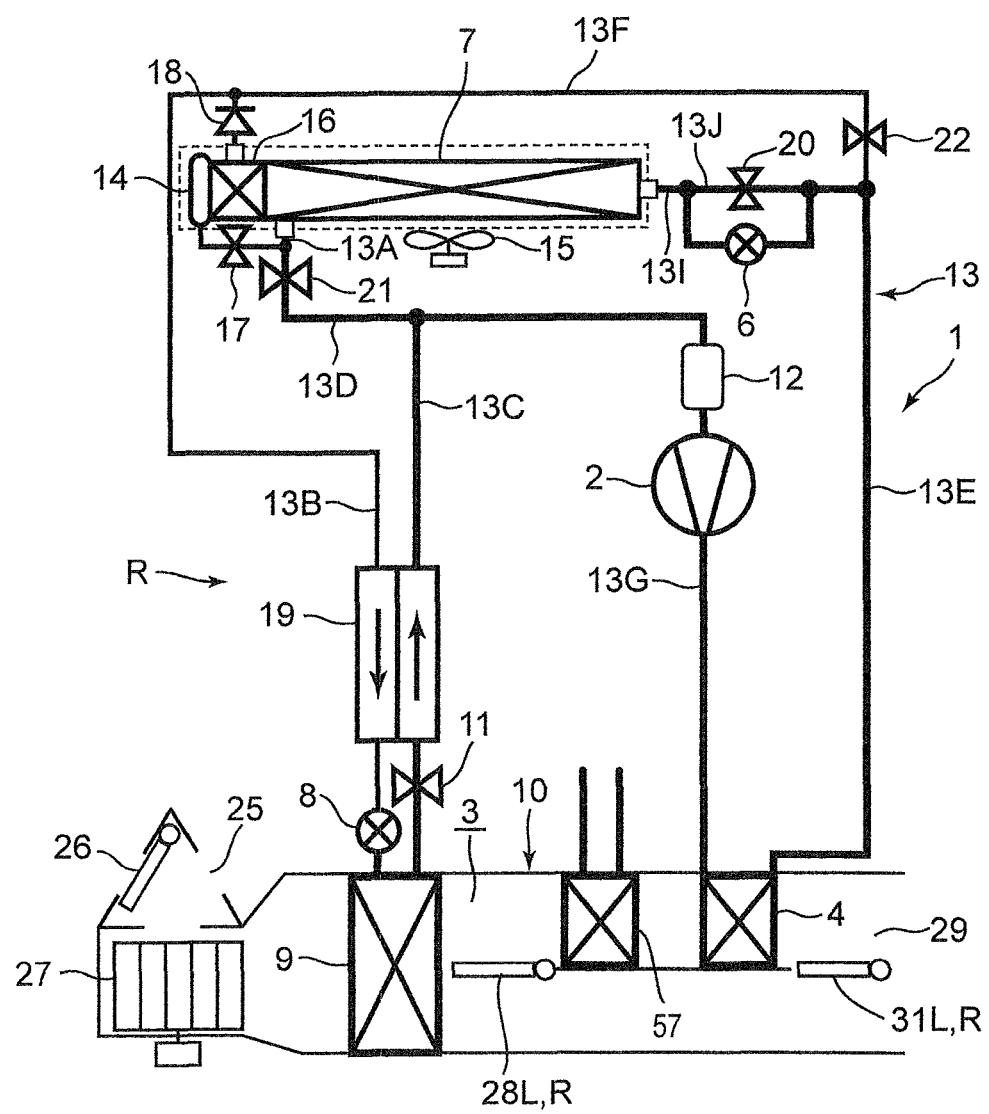
FIG. 1 is a constitutional view of a vehicle air conditioner of one embodiment to which the present invention is applied (Embodiment 1)

FIG. 1 shows a constitutional view of a vehicle air conditioner 1 of one embodiment of the present invention. In this case, a vehicle of the embodiment to which the present invention is applied is an electric vehicle (EV) which does not have an engine (an internal combustion engine) or a so-called hybrid car using the engine together with an electric motor for running. The vehicle runs with the electric motor for running which is driven by power charged in a battery (which is not shown in the drawing), or the electric motor assists the running, but the vehicle air conditioner 1 of the present invention is also applicable to a usual car which runs with the engine.

On the other hand, the vehicle air conditioner 1 of the present invention is driven with the power of the battery or the like (an external power when the vehicle is of a plug-in type). Specifically, the vehicle air conditioner 1 of this embodiment performs heating of a vehicle interior by a heat pump operation of driving, with the battery or the like, an electric type of compressor constituting a refrigerant circuit, and further, the vehicle air conditioner selectively executes respective operation modes of dehumidifying and heating, dehumidifying and cooling, and cooling.

The vehicle air conditioner 1 of this embodiment performs air conditioning (heating, cooling, dehumidifying, and ventilation) of the vehicle interior of the car, and there are successively connected, by a refrigerant pipe 13, an electric type of compressor (an electric compressor) 2 which compresses a refrigerant, a radiator 4 disposed in an air flow passage 3 constituted in an HVAC unit 10 which is made of a hard resin and in which vehicle interior air passes and circulates, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve (which may be a mechanical expansion valve) to decompress and expand the refrigerant, a heat absorber 9 disposed in the air flow passage 3 on an upstream side of air flowing through the air flow passage 3 to the radiator 4, to let the refrigerant absorb heat from interior and exterior of the vehicle during the cooling and during the dehumidifying, an evaporation capability control valve 11 which adjusts an evaporation capability in the heat absorber 9, an accumulator 12 and others, thereby constituting a refrigerant circuit R. It is to be noted that in the outdoor heat exchanger 7, an outdoor blower 15 to perform the heat exchange between the outdoor air and the refrigerant is disposed.

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (an opening/closing valve) 21 to be opened during the heating. In addition, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (an opening/closing valve) 22 to be opened during the dehumidifying.

Furthermore, the outdoor expansion valve 6 is connected in parallel with a bypass pipe 13J, and in the bypass pipe 13J, a solenoid valve (an opening/closing valve) 20 is interposed to open in a cooling mode so that the refrigerant bypasses the outdoor expansion valve 6 to flow.

Further in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in the air flow passage 3 on the upstream side of the air flowing through the air flow passage 3 to the radiator 4 and the air downstream side of the heat absorber 9, air mix dampers 28L and 28R (FIG. 1 to FIG. 4) are disposed to adjust a degree at which indoor air or outdoor air passes through the radiator 4. Further in the air flow passage 3 on the air downstream side of the radiator 4, there is formed each outlet (represented by an outlet 29 in FIG. 1) of foot, vent or defroster, and in the outlet 29, outlet changing dampers 31L and 31R (FIG. 1 and FIG. 2) are disposed to execute changing control of blowing of the air from each outlet mentioned above.

Furthermore, in FIG. 1, reference numeral 57 indicates an electric heater disposed in the vehicle air conditioner 1 of the embodiment. The electric heater 57 of the embodiment is constituted of a PTC heater and is disposed in the air flow passage 3 on the upstream side of the air flowing through the air flow passage 3 to the radiator 4 and the air downstream side of the air mix dampers 28L and 28R.

Figure 4:
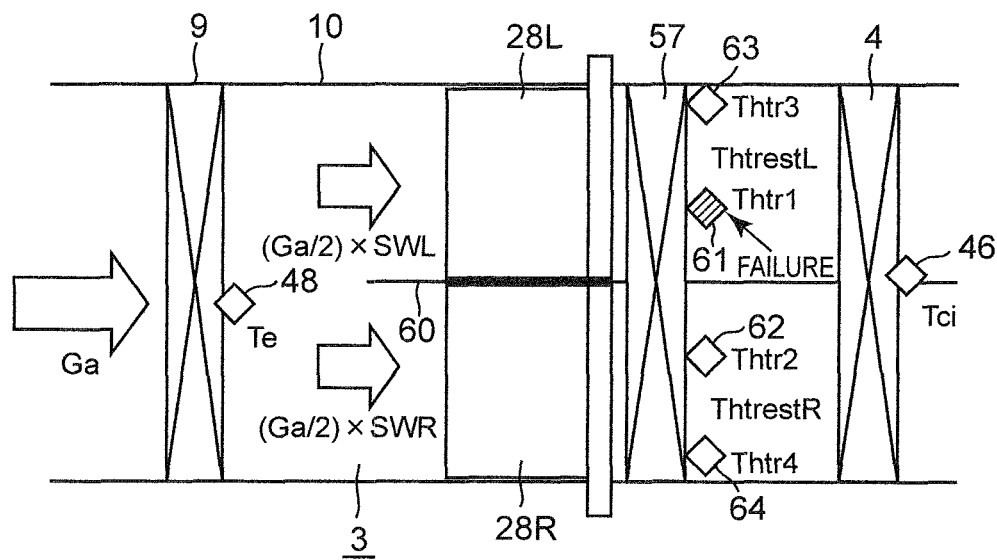
FIG. 4 is a cross-sectional plan view of the HVAC unit of FIG. 3.

It is to be noted that in the vehicle air conditioner 1 of the embodiment, right/left independent air-conditioning control is enabled on a driver's seat and a front passenger seat of the vehicle, and the inside of the air flow passage 3 including the radiator 4 and the electric heater 57 is divided into right and left side by a partition plate 60 as shown in FIG. 4. Then, the air mix damper 28L and the outlet changing damper 31L which are mentioned above are provided as a left air mix damper and a left outlet changing damper (e.g., for the front passenger seat) in the air flow passage 3 on the left side, and the air mix damper 28R and the outlet changing damper 31R are provided as a right air mix damper and a right outlet changing damper (e.g., for the driver's seat) in the air flow passage 3 on the right side, so that right/left identical air-conditioning control and the right/left independent air-conditioning control are executable.

Specifically, when the right/left identical air-conditioning control is set by an air conditioning operating portion 53, the air mix damper 28L and the air mix damper 28R perform the same operation, and the outlet changing dampers 31L and 31R also perform the same operation. On the other hand, when the right/left independent air-conditioning control is set, the air mix damper 28L and the air mix damper 28R operate independently of each other, and the outlet changing dampers 31L and 31R also operate independently of each other.

Figure 2:
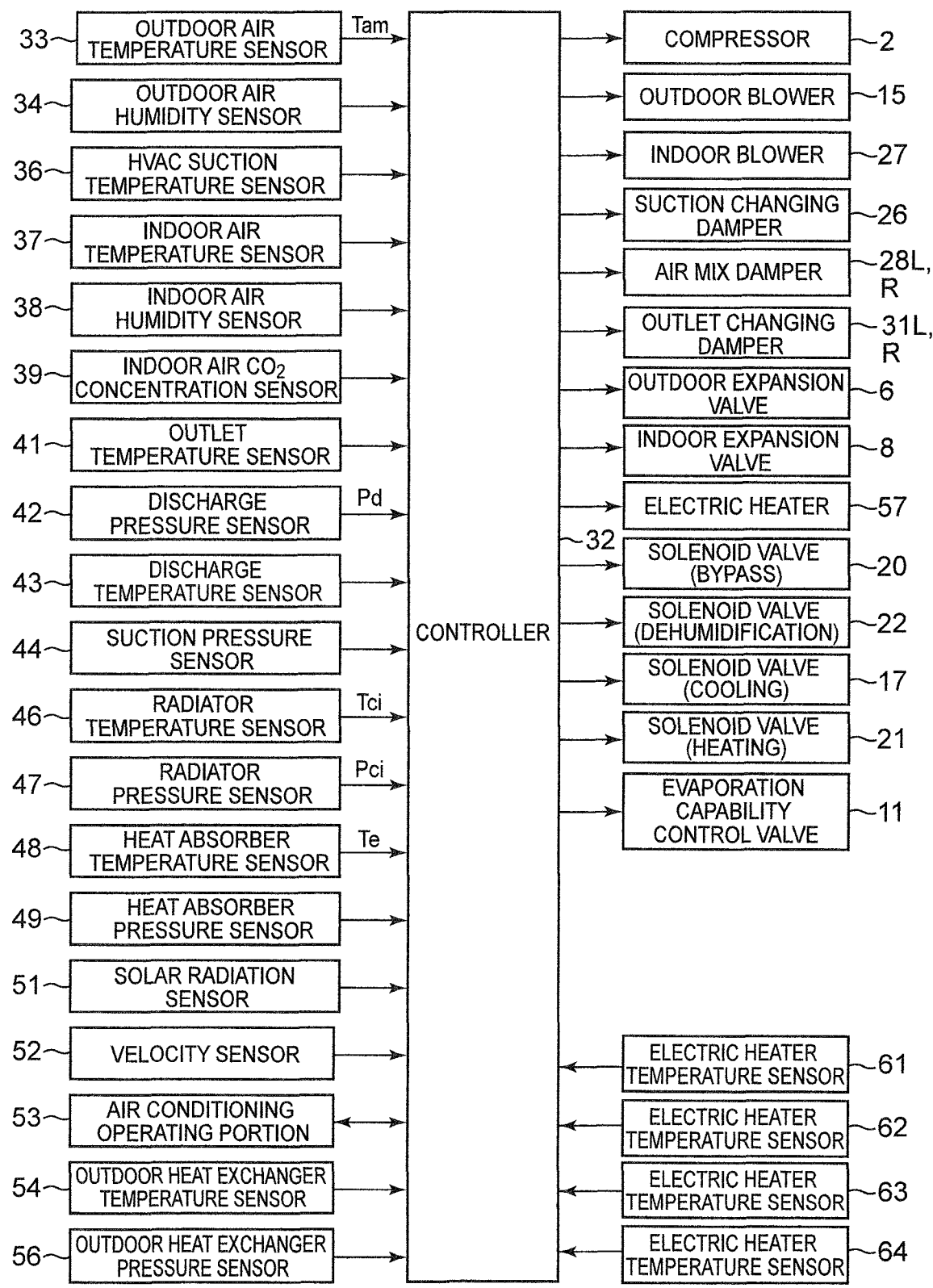
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air which has just passed through the radiator 4 or the temperature of the radiator 4 itself or the temperature of the air which has just been heated in the radiator 4), a radiator pressure sensor 47 which detects a refrigerant pressure Pci of the radiator 4 (the pressure in the radiator 4 or of the refrigerant which has just flowed out from the radiator 4), a heat absorber temperature sensor 48 which detects a temperature Te of the heat absorber 9 (the temperature of the air which has just passed through the heat absorber 9 or the temperature of the heat absorber 9 itself or the temperature of the air which has just been cooled in the heat absorber 9), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, the air conditioning operating portion 53 with a display which sets the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is also connected to respective outputs of a plurality of (four in the embodiment) electric heater temperature sensors 61 to 64 which detect a temperature of the electric heater 57. In this case, the electric heater temperature sensors 61 and 63 are attached to detect the temperature of the electric heater 57 in a left part divided by the partition plate 60, and the electric heater temperature sensors 62 and 64 are attached to detect the temperature of the electric heater 57 in a right part (FIG. 4).

On the other hand, an output of the controller 32 is connected to the compressor 2, the outdoor blower 15, the indoor blower (the blower fan) 27, the suction changing damper 26, the air mix dampers 28L and 28R, the outlet changing dampers 31L and 31R, the outdoor expansion valve 6, the indoor expansion valve 8, the respective solenoid valves 22, 17, 21 and 20, the evaporation capability control valve 11, and the electric heater 57. Then, the controller 32 controls these components on the basis of the outputs of the respective sensors and the setting input by the air conditioning operating portion 53.

Next, description will be made as to an operation of the vehicle air conditioner 1 of the embodiment having the above constitution. In the embodiment, the controller 32 changes and executes respective roughly divided operation modes of a heating mode, a dehumidifying and heating mode, an internal cycle mode, a dehumidifying and cooling mode, and a cooling mode. Initially, description will be made as to a flow of the refrigerant in each operation mode.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Then, the controller operates the compressor 2 and the respective blowers 15 and 27, and the air mix dampers 28L and 28R have a state of passing the air blown out from the indoor blower 27 through the electric heater 57 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 heats by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (a heat pump). Then, the low-temperature refrigerant flowing out from the outdoor heat exchanger 7 flows through the refrigerant pipe 13D and the solenoid valve 21, and flows from the refrigerant pipe 13C into the accumulator 12 to perform gas liquid separation therein, and then the gas refrigerant is sucked into the compressor 2, thereby repeating this circulation. The air heated in the radiator 4 is blown out from the outlet 29, thereby performing the heating of the vehicle interior.

On the other hand, when the controller 32 judges that a heating capability by the radiator 4 runs short in this heating mode, the controller energies the electric heater 57 to heat, thereby executing heating assistance by the electric heater 57. In this case, the air heated by the electric heater 57 and further heated in the radiator 4 is blown out from the outlet 29, thereby performing the heating of the vehicle interior.

As described later in the embodiment, the controller 32 controls a number of revolution of the compressor 2 on the basis of a high pressure of the refrigerant circuit R which is detected by the radiator pressure sensor 47 (or the discharge pressure sensor 42), also controls a valve position of the outdoor expansion valve 6 on the basis of a volume of the air passed through the radiator 4 and a target outlet temperature, and controls a subcool degree of the refrigerant in an outlet of the radiator 4. It is to be noted that the controller may control the valve position of the outdoor expansion valve 6 on the basis of the temperature of the radiator 4 or the outdoor air temperature in place of or in addition to the above parameters.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution of the compressor 2 on the basis of the high pressure of the refrigerant circuit R which is detected by the discharge pressure sensor 42 or the radiator pressure sensor 47, and also controls a valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. When the outdoor expansion valve 6 and the solenoid valve 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix dampers 28L and 28R have the state of passing the air blown out from the indoor blower 27 through the electric heater 57 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls a refrigerant pressure (the radiator pressure Pci) of the radiator 4.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)), and the air mix dampers 28L and 28R have a state where the air does not pass through the electric heater 57 and the radiator 4. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior. In this cooling mode, the controller 32 controls the number of revolution of the compressor 2 on the basis of the temperature of the heat absorber 9 which is detected by the heat absorber temperature sensor 48.

(6) Changing Control of Operation Mode

On startup, the controller 32 selects the operation mode on the basis of an outdoor air temperature Tam detected by the outdoor air temperature sensor 33 and a target outlet temperature TAO. Then, after the startup, the controller selects and changes each operation mode mentioned above in accordance with changes of environments of the outdoor air temperature Tam, the target outlet temperature TAO and the like and setting conditions. In this case, the controller 32 basically changes from the heating mode to the dehumidifying and heating mode, or from the dehumidifying and heating mode to the heating mode, changes from the dehumidifying and heating mode to the dehumidifying and cooling mode or from the dehumidifying and cooling mode to the dehumidifying and heating mode, and changes from the dehumidifying and cooling mode to the cooling mode or from the cooling mode to the dehumidifying and cooling mode, but when changing from the dehumidifying and heating mode to the dehumidifying and cooling mode and when changing from the dehumidifying and cooling mode to the dehumidifying and heating mode, the controller changes via the internal cycle mode. Furthermore, the controller may change from the cooling mode to the internal cycle mode or from the internal cycle mode to the cooling mode.

(7) Protecting Operation of Electric Heater 57

Next, description will be made as to a protecting operation by the controller 32 when the temperature of the electric heater 57 abnormally rises. As described above, when the heating capability by the radiator 4 runs short in the heating mode, the controller 32 controls an amount of power to be supplied to the electric heater 57 to compensate for the shortage. In such energization control, when the temperature of the electric heater 57 abnormally rises from any cause, the controller executes the protecting operation as described hereinafter.

(7-1) Energization Limiting Control of Electric Heater 57

Initially, on the basis of a temperature Thtr1 (a detected value) of the electric heater 57 which is detected by the electric heater temperature sensor 61, a temperature Thtr2 (a detected value) of the electric heater 57 which is detected by the electric heater temperature sensor 62, a temperature Thtr3 (a detected value) of the electric heater 57 which is detected by the electric heater temperature sensor 63 and a temperature Thtr4 (a detected value) of the electric heater 57 which is detected by the electric heater temperature sensor 64, the controller 32 judges that the highest temperature Thtrmax (Thtrmax=MAX(Thtr1, Thtr2, Thtr3, Thtr4)) among the temperatures (the detected values) Thtr1 to 4 approaches a predetermined first threshold value (e.g., +90° C.), and in this case, the controller executes energization limiting control to limit the amount of the power to be supplied to the electric heater 57 so that the highest temperature Thtrmax does not exceed the first threshold value. In consequence, the controller inhibits the temperature rise of the electric heater 57.

(7-2) Energization Stop Control of Electric Heater 57

When even under such energization limiting control, the highest temperature Thtrmax further rises and exceeds a second threshold value (e.g., +100° C.) higher than the first threshold value, the controller 32 executes energization stop control to stop the energization to the electric heater 57. Such energization limiting control and energization stop control are constituted to securely inhibit rapid temperature rise of the electric heater 57 and to avoid beforehand the disadvantage that the HVAC unit 10 (the air flow passage 3) made of a resin is deformed or molten due to the abnormally high temperature by overshoot.

(8) Failure Diagnosis Operation of Electric Heater Temperature Sensors 61 to 64

Figure 5:
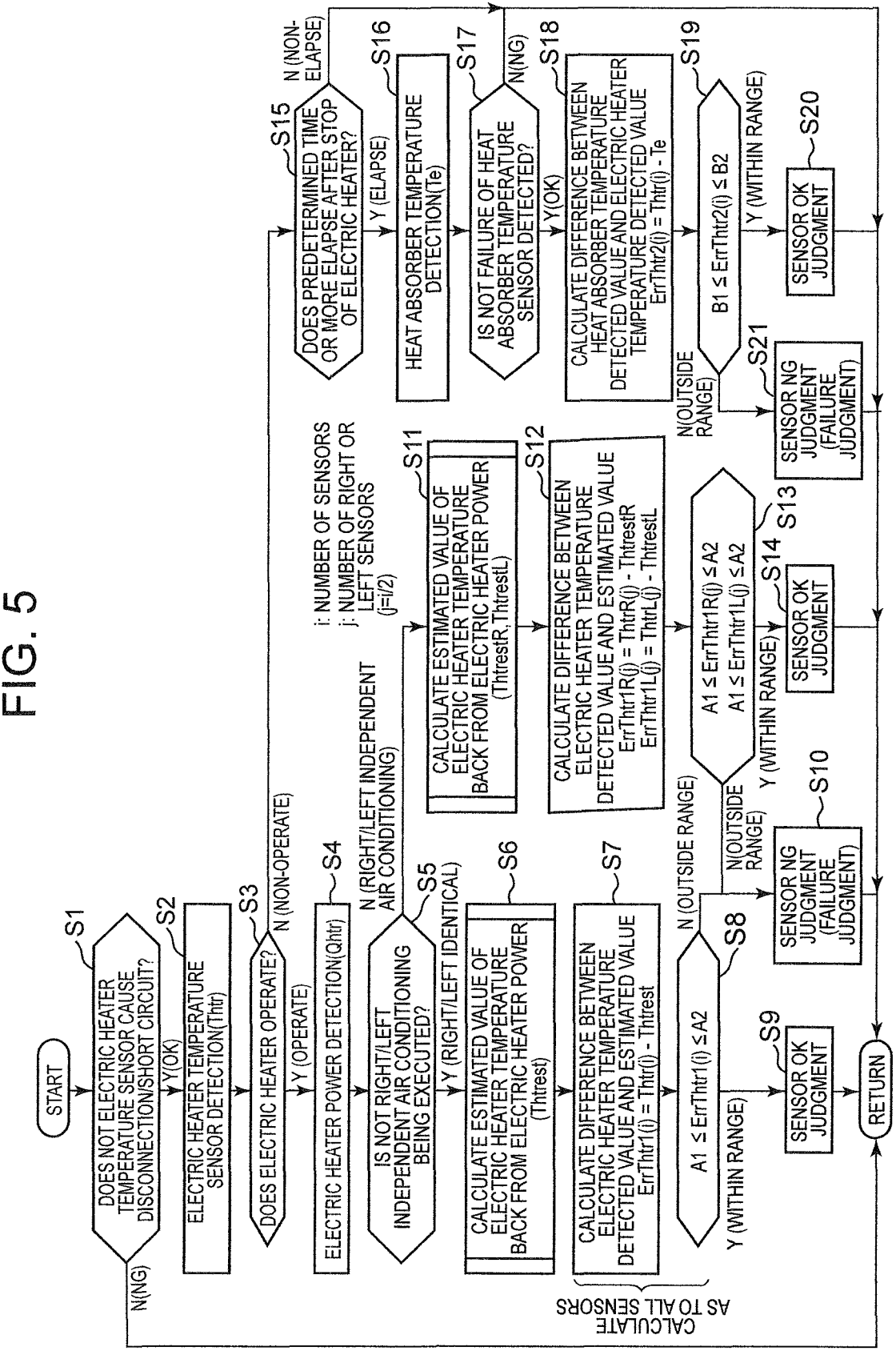
FIG. 5 is a flowchart to explain a control operation of the controller of FIG. 2.

Furthermore, the controller 32 diagnoses whether or not a failure occurs in each of the electric heater temperature sensors 61 to 64 of the electric heater 57 as shown in a flowchart of FIG. 5 in all the operation modes or at least the heating mode. Hereinafter, description will be made as to this failure diagnosis operation of the controller 32 with reference to FIG. 5. Initially, in step S1 of FIG. 5, the controller 32 judges from the detected values of the respective electric heater temperature sensors 61 to 64 whether or not each sensor causes disconnection or short circuit. The disconnection or the short circuit is electrically detectable in accordance with a voltage to be input into the controller 32. When it is judged in the step S1 that one of the electric heater temperature sensors 61 to 64 causes the disconnection or the short circuit (NG), the controller returns to the other control and displays an error in the air conditioning operating portion 53 to prohibit the energization to the electric heater 57.

On the other hand, when it is judged in the step S1 that all the electric heater temperature sensors 61 to 64 do not cause the disconnection or the short circuit (OK), the controller 32 takes in the temperatures Thtr1 to Thtr4 (the detected values) detected by the respective electric heater temperature sensors 61 to 64 in step S2. Next, the controller judges in step S3 whether or not the electric heater 57 is energizing (operating), and when the controller judges that the electric heater is energizing (operating), the controller advances to step S4 to detect a consumed power Qhtr of the electric heater 57. Next, the controller advances to step S5 to judges whether or not the right/left independent air-conditioning control is being executed, and when the controller judges that the right/left independent air-conditioning control is not executed and the right/left identical air-conditioning control is being executed, the controller advances to step S6 to calculate an estimated value Thtrest of the temperature of the electric heater 57 back from the consumed power Qhtr of the electric heater 57 by use of Equation (1) mentioned below.

$$Thtrest=(Qhtr\times\phi)/(Cpa\times Ga\times SW\times\gamma aTe\times1.16)+Te \quad \text{Equation (1)},$$

in which $\phi$ is a temperature efficiency of the electric heater 57, Cpa is constant pressure specific heat of air, Te is the temperature of the heat absorber 9 which is detected by the heat absorber temperature sensor 48, Ga is an actual system air volume (m$^3$/h), SW is an air mix damper position, $\gamma$aTe is an air specific weight, and 1.16 is a coefficient to match a unit. The air mix damper position SW is represented by SW=(TAO−Te)/(Tci−Te), in which TAO is the target outlet temperature and Tci is the temperature of the radiator 4 which is detected by the radiator temperature sensor 46.

In this embodiment, the heat absorber 9 is only disposed on the air upstream side of the electric heater 57, and hence the temperature Te detected by the heat absorber temperature sensor 48 is equal to the temperature of the air flowing into the electric heater 57. Then, (Thtrest−Te) is a raised temperature in the electric heater 57, and Equation (1) mentioned above is a deformation of a general equation $Qhtr \times \phi = (Cpa \times Ga \times SW \times \gamma a Te \times 1.16) \times (Thtrest-Te)$ indicating a relation between this raised temperature (Thtrest−Te) in the electric heater 57 and the consumed power Qhtr. The controller calculates the estimated value back from the consumed power Qhtr and the temperature Te of the heat absorber in this manner, whereby it is possible to accurately calculate the estimated value Thtrest of the temperature of the electric heater 57 (this also applies to Equation (2) and Equation (3) mentioned below).

Furthermore, in the embodiment, the heat absorber temperature sensor 48 is utilized to detect the temperature (Te) of the air flowing into the electric heater 57, and it is not necessary to separately provide a temperature sensor to detect the temperature of the air flowing into the electric heater 57, which achieves decrease of the number of components and decrease of cost.

In this way, the controller 32 calculates the estimated value Thtrest of the temperature of the electric heater 57 in the step S6, and next compares each of the temperatures (the detected values) Thtr1 to Thtr4 of all the electric heater temperature sensors 61 to 64 with the estimated value Thtrest in step S7, to calculate differences ErrThtr1(1 to 4). In this case, the difference ErrThtr1(1)=Thtr1−Thtrest, the difference ErrThtr1(2)=Thtr2−Thtrest, the difference ErrThtr1(3)=Thtr3−Thtrest, and the difference ErrThtr1(4)=Thtr4−Thtrest.

Next, the controller judges in step S8 whether or not each of the differences ErrThtr1(1 to 4) as to the respective electric heater temperature sensors 61 to 64 falls within a predetermined allowable range (a predetermined value A1 or more, and a predetermined value A2 or less, but A1<A2). Furthermore, when the difference falls within the allowable range, the controller advances to step S9 to judge that the electric heater temperature sensor 61, 62, 63 or 64 is normal (OK), and when there is the electric heater temperature sensor 61, 62, 63 or 64 in which the difference is outside the allowable range, the controller advances to step S10 to judge that the sensor fails (NG).

On the other hand, in the case of executing the right/left independent air-conditioning control in the step S5, the controller 32 advances to step S11 to calculate back an estimated value ThtrestR of the temperature on the right side of the electric heater 57 and an estimated value ThtrestL of the temperature on the left side thereof by use of Equation (2) and Equation (3) mentioned below as to the right side and the left side of the electric heater 57 divided by the partition plate 60.

$$ThtrestR = \{(Qhtr/2) \times \phi\}/\{Cpa \times (Ga/2 \times SWR) \times \gamma a Te \times 1.16\} + Te \quad \text{Equation (2), and}$$

$$ThtrestL = \{(Qhtr/2) \times \phi\}/\{Cpa \times (Ga/2 \times SWL) \times \gamma a Te \times 1.16\} + Te \quad \text{Equation (3),}$$

in which SWR is an air mix damper position of the air mix damper 28R on the right side, and means an air volume ratio on the right side of the electric heater 57. Furthermore, SWL is an air mix damper position of the air mix damper 28L on the left side, and means an air volume ratio on the left side of the electric heater 57. The other factors are similar to those in Equation (1), but each of the consumed power Qhtr and the actual system air volume Ga is adjusted to ½.

Also in this case, the controller adds the temperature Te of the air flowing into the electric heater 57 to the temperature of each of the right side and the left side of the electric heater 57 itself which is calculated back from the consumed power Qhtr/2 in Equations (2) and (3), and hence it is possible to more accurately calculate the estimated values ThtrestR and ThtrestL of the temperatures on the right side and the left side of the electric heater 57.

In the case of executing the right/left independent air-conditioning control, the controller 32 thus calculates the estimated value ThtrestR of the temperature on the right side of the electric heater 57 and the estimated value ThtrestL of the temperature on the left side thereof in the step S11, and next in step S12, the controller compares each of the temperatures (the detected values) Thtr2 and Thtr4 of the electric heater temperature sensors 62 and 64 with the estimated value ThtrestR on the right side as to the electric heater temperature sensors 62 and 64 on the right side, to calculate a difference ErrThtr1R (2, 4) between the values. In this case, the difference ErrThtr1R(2)=Thtr2−ThtrestR, and the difference ErrThtr1R(4)=Thtr4−ThtrestR. Furthermore, as to the electric heater temperature sensors 61 and 63 on the left side, the controller compares each of the temperatures (the detected values) Thtr1 and Thtr3 of the electric heater temperature sensors 61 and 63 with the estimated value ThtrestL on the left side, to calculate a difference ErrThtr1L (1, 3) between the values. In this case, the difference ErrThtr1L(1)=Thtr1−ThtrestL and the difference ErrThtr1L(3)=Thtr3−ThtrestL.

Next, the controller judges in step S13 whether or not each of the differences ErrThtr1L(1), ErrThtr1L(3), ErrThtr1R(2) and ErrThtr1R(4) as to the respective electric heater temperature sensors 61 to 64 falls within a predetermined allowable range (the predetermined value A1 or more, and the predetermined value A2 or less, but A1<A2). Furthermore, when the difference falls within the allowable range, the controller advances to step S14 to judge that the electric heater temperature sensor 61, 62, 63 or 64 is normal (OK), and when there is the electric heater temperature sensor 61, 62, 63 or 64 in which the difference is outside the allowable range, the controller advances to the step S10 to judge that the sensor fails (NG).

Thus, in the case of executing the right/left independent air-conditioning control of the vehicle interior, the controller 32 calculates the estimated values ThtrestR and ThtrestL independently on the right and left sides by use of the right and left air volume ratios SWR and SWL, and hence also in the case of performing air conditioning independently at the driver's seat, the front passenger seat and the like, failure diagnosis of each of the electric heater temperature sensors 61 to 64 is achievable without hindrance.

On the other hand, when the controller 32 judges in the step S3 that the electric heater 57 is not energizing (is not operating) at present, the controller advances to step S15 to judge whether or not predetermined time or more elapses after the stop of the energization to the electric heater 57. In consequence, an influence by heat generation of the electric heater 57 itself is avoided. Then, the controller waits until the predetermined time or more elapses after the stop (non-elapse), and in case of the elapse of the predetermined time (elapse), the controller advances to step S16 to take in the temperature Te of the heat absorber 9 which is detected by the heat absorber temperature sensor 48, and judges whether or not the heat absorber temperature sensor 48 fails, from the detected value in step S17.

When the controller judges in the step S17 that the heat absorber temperature sensor 48 is normal (OK), the controller advances to step S18 and compares the temperature Te that is the detected value of the heat absorber temperature sensor 48 with each of the temperatures (the detected values) Thtr1 to Thtr4 of all the electric heater temperature sensors

61 to 64, to calculate differences ErrThtr2(1 to 4). In this case, the difference ErrThtr2(1)=Thtr1−Te, the difference ErrThtr2(2)=Thtr2−Te, the difference ErrThtr2(3)=Thtr3−Te, and the difference ErrThtr2(4)=Thtr4−Te.

Next, the controller judges in step S19 whether or not each of the differences ErrThtr2(1 to 4) as to the respective electric heater temperature sensors 61 to 64 falls within a predetermined allowable range (a predetermined value B1 or more, and a predetermined value B2 or less, but B1<B2). Furthermore, when the difference falls within the allowable range, the controller advances to step S20 to judge that the electric heater temperature sensor 61, 62, 63 or 64 is normal (OK), and when there is the electric heater temperature sensor 61, 62, 63 or 64 in which the difference is outside the allowable range, the controller advances to step S21 to judge that the sensor fails (NG).

As described above, the heat absorber 9 is only present on the air upstream side of the electric heater 57, and hence, the temperature Te detected by the heat absorber temperature sensor 48 is the temperature of the air flowing into the electric heater 57. Furthermore, in this case, the energization to the electric heater 57 stops and any heat is not generated, and hence each of the temperatures Thtr1 to Thtr4 detected by the sensors is approximately equal to Te as long as each of the electric heater temperature sensors 61 to 64 is normal.

In the embodiment, during the stop of the energization to the electric heater 57, the controller compares the temperature Te that is the temperature of the air flowing into the electric heater 57 with each of the temperatures Thtr1 to Thtr4 which are the detected values of the respective electric heater temperature sensors 61 to 64, and the controller judges that the electric heater temperature sensor in which the difference ErrThtr2 (1 to 4) is outside the predetermined range (B1 or more and B2 or less) fails. Therefore, also when the electric heater 57 does not generate heat, it is possible to diagnose the failure of each of the electric heater temperature sensors 61 to 64 without hindrance. In this case, the temperature Te of the heat absorber 9 is utilizable as the temperature of the air flowing into the electric heater 57, and hence it is not necessary to separately provide a temperature sensor of the inflow air or the like.

(9) Protecting Operation of Electric Heater 57 during Failure of Electric Heater Temperature Sensors 61 to 64

As described above, the controller 32 diagnoses whether or not all the electric heater temperature sensors 61 to 64 detecting the temperature of the electric heater 57 fail, and when the controller judges the failure of one or a plurality of the electric heater temperature sensors 61 to 64 in the step S10 or the step S21 of FIG. 5, the controller displays the error in the air conditioning operating portion 53.

Furthermore, when the detected values of the electric heater temperature sensors other than the electric heater temperature sensor judged to have failed and the estimated value Thtrest mentioned above are all within a predetermined normal range, the controller 32 continues the energization to the electric heater 57, but when the values are outside the normal range, the controller prohibits the energization to the electric heater 57.

Thus, also when one of the electric heater temperature sensors 61 to 64 fails, it is possible to continue the energization to the electric heater 57 as long as the detected values of the electric heater temperature sensors other than the failed electric heater temperature sensor and the estimated value Thtrest are within the predetermined normal range. Consequently, also during the failure of the electric heater temperature sensors 61 to 64, the controller continues the air conditioning of the vehicle interior, and hence it is possible to prevent deterioration of comfort.

Now that the detected values of the electric heater temperature sensors other than the electric heater temperature sensor judged to have failed and the estimated value Thtrest mentioned above are all within the predetermined normal range, the controller 32 continues the energization to the electric heater 57, and further executes the above-mentioned protecting operation on the basis of the highest value among the detected values of the electric heater temperature sensors other than the electric heater temperature sensor judged to have failed and the estimated value Thtrest mentioned above.

(9-1) Energization Limiting Control of Electric Heater 57 during Failure of Electric Heater Temperature Sensors 61 to 64

Figure 3:
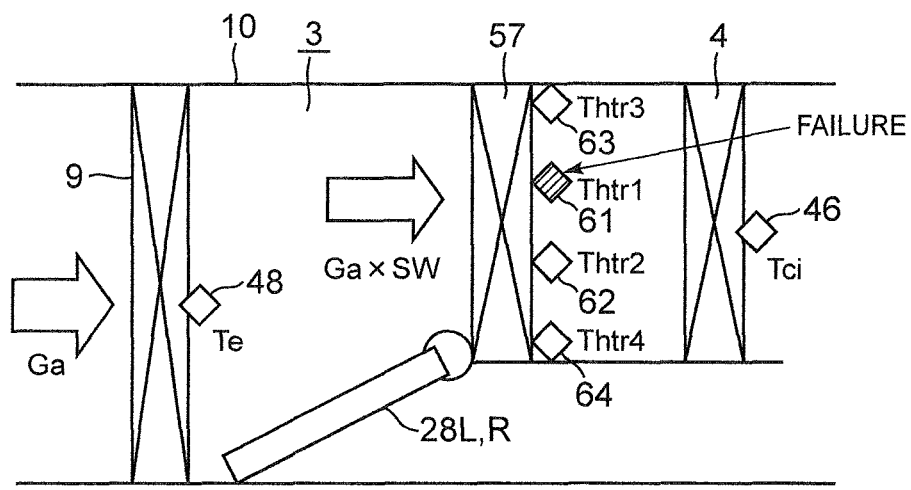
FIG. 3 is a vertical cross-sectional side view of an HVAC unit of the vehicle air conditioner of FIG. 1.

Here, FIG. 3 and FIG. 4 show an example where it is judged that, for example, the electric heater temperature sensor 61 fails. In this example, the controller 32 judges that, among the temperature Thtr2 (the detected value) of the electric heater 57 which is detected by the electric heater temperature sensor 62, the temperature Thtr3 (the detected value) of the electric heater 57 which is detected by the electric heater temperature sensor 63 and the temperature Thtr4 (the detected value) of the electric heater 57 which is detected by the electric heater temperature sensor 64 and the estimated value Thtrest mentioned above, the highest temperature Thtrmax (Thtrmax=MAX(Thtr2, Thtr3, Thtr4, Thtrest)) approaches the above-mentioned first threshold value (e.g., +90° C.), and in this case, the controller executes the energization limiting control to limit the amount of the power to be supplied to the electric heater 57 so that the highest temperature Thtrmax does not exceed the first threshold value. In consequence, the controller inhibits the temperature rise of the electric heater 57 also during the failure of the electric heater temperature sensor 61.

(9-2) Energization Stop Control of Electric Heater 57 during Failure of Electric Heater Temperature Sensors 61 to 64

Furthermore, when even under such energization limiting control, the highest temperature Thtrmax further rises and exceeds the above-mentioned second threshold value (e.g., +100° C.) higher than the first threshold value, the controller 32 executes the energization stop control to stop the energization to the electric heater 57. By such energization limiting control and energization stop control, the controller securely inhibits the rapid temperature rise of the electric heater 57 and avoids beforehand the disadvantage that the HVAC unit 10 (the air flow passage 3) made of the resin is deformed or molten due to the abnormally high temperature by the overshoot, also during the failure of the electric heater temperature sensor 61.

It is to be noted that in the case of performing the above-mentioned right/left independent air-conditioning control, the controller 32 executes the protecting operation on the basis of the highest temperature Thtrmax (Thtrmax=MAX(Thtr2, Thtr3, Thtr4, ThtrestR, ThtrestL)) among the temperatures (the detected values) Thtr2 to 4 and the estimated values ThtrestR and ThtrestL. Consequently, also in the right/left independent air-conditioning control, the controller protects the HVAC unit 10 (the air flow passage 3) without hindrance.

(9-3) Decrease Control of Threshold Value

It is to be noted that when the controller 32 judges that one of the electric heater temperature sensors 61 to 64 fails, and continues the energization to the electric heater 57, the controller decreases each of the above-mentioned first threshold value and second threshold value as much as a predetermined value (e.g., 5 deg). Consequently, also in such an abnormal case, the controller executes the control in a safer direction.

As described above, in the present invention, when one electric heater temperature sensor (the electric heater temperature sensor 61 in the embodiment) fails among the plurality of electric heater temperature sensors 61 to 64 which detect the temperature of the electric heater 57, the controller 32 executes the protecting operation of the electric heater 57 on the basis of the highest value among the detected values (the temperatures Thtr2 to Thtr4 in the embodiment) of the electric heater temperature sensors (the electric heater temperature sensors 62 and 64 in the embodiment) other than the failed electric heater temperature sensor and the estimated value Thtrest. Therefore, also in case of the failure of one or a plurality of the electric heater temperature sensors 61 to 64 from any cause, the controller precisely executes the protecting operation to inhibit the abnormal temperature rise of the electric heater 57, and hence it is possible to effectively prevent breakage of the HVAC unit 10 (the air flow passage 3).

In this case, during the energization to the electric heater 57, the controller 32 executes a failure diagnosis operation of comparing the estimated value Thtrest of the temperature of the electric heater 57 with each of the detected values (the temperatures Thtr1 to Thtr4) of the respective electric heater temperature sensors 61 to 64, and judging that the electric heater temperature sensor in which the difference (ErrThtr1 (1 to 4) or the like) is outside a predetermined range fails, so that it is possible to precisely diagnose, from the detected value of the respective electric heater temperature sensor 61 to 64, whether or not the electric heater temperature sensor fails.

(10) Another Failure Diagnosis Operation

It is to be noted that the present invention is not limited to the failure diagnosis operation of the step S15 and the subsequent steps of FIG. 5, and during the stop of the energization to the electric heater 57, the controller may confirm variances of the temperatures Thtr1 to Thtr4 which are detected by the respective electric heater temperature sensors 61 to 64, at a predetermined timing such as a time when a car (vehicle) key turns on, and the controller may judge that the respective electric heater temperature sensors 61 to 64 are normal, when all the temperatures Thtr1 to Thtr4 (the detected values) are within the predetermined allowable range. Consequently, it is possible to comparatively easily judge that the plurality of electric heater temperature sensors are normal, excluding a case where all the electric heater temperature sensors 61 to 64 have already failed at a vehicle startup time or the like.

(11) Clogging Judgment Operation of Electric Heater 57

Furthermore, when the detected values (the temperatures Thtr1 to Thtr4) of the respective electric heater temperature sensors 61 to 64 indicate about the same value during the stop of the energization to the electric heater 57 and the detected value of one of the electric heater temperature sensors indicates a different value with a predetermined difference from the detected values of the other electric heater temperature sensors during the energization to the electric heater 57, the controller 32 judges clogging of the electric heater 57 to stop the energization. Consequently, the controller also precisely judges the clogging of the electric heater 57, and hence it is possible to avoid beforehand the disadvantage that the HVAC unit 10 (the air flow passage 3) breaks due to the abnormal temperature rise of the clogged electric heater 57.

Embodiment 2

Figure 6:
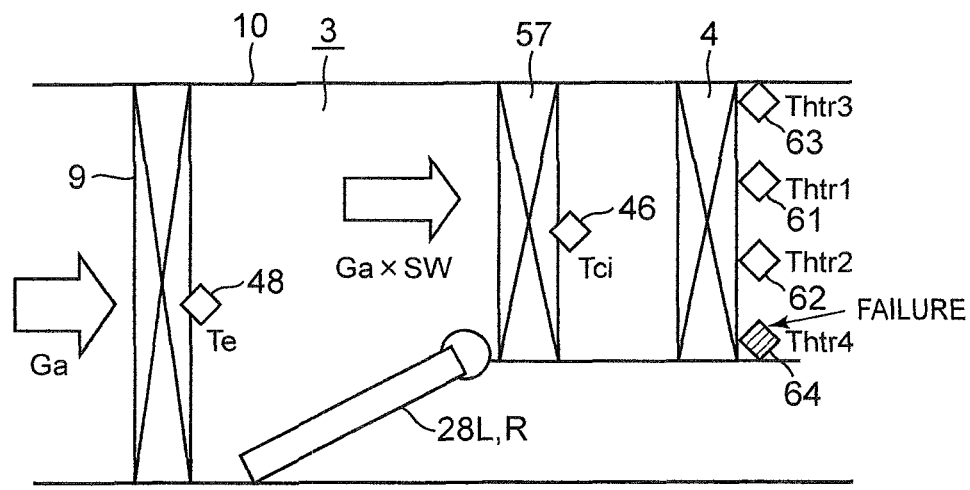
FIG. 6 is a vertical cross-sectional side view of an HVAC unit of a vehicle air conditioner of another embodiment (Embodiment 2)
Figure 7:
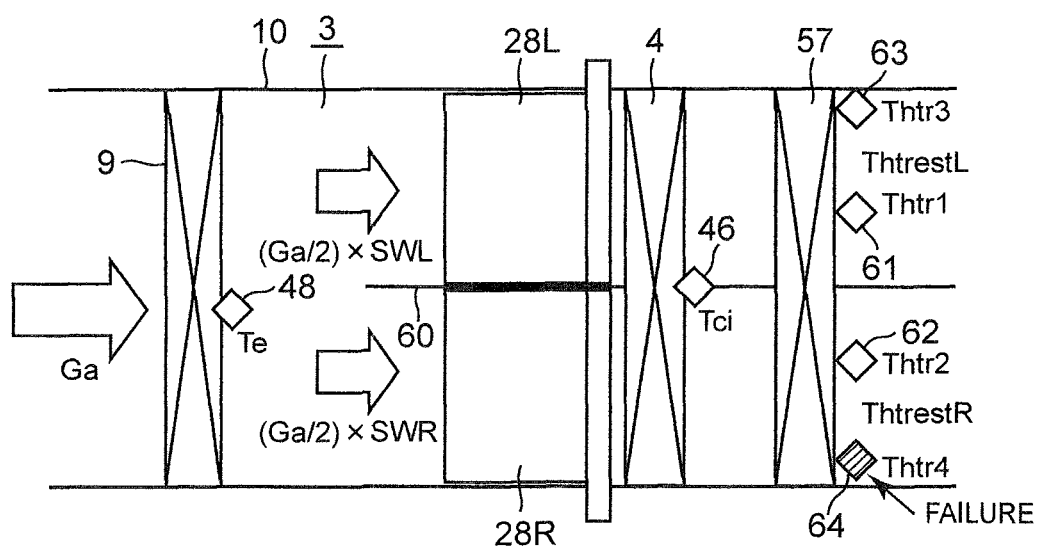
FIG. 7 is a cross-sectional plan view of the HVAC unit of FIG. 6.

Next, FIG. 6 and FIG. 7 show an example where a radiator 4 is disposed on an upstream side of air flowing through an air flow passage 3 to an electric heater 57. It is to be noted that in the respective drawings, components denoted with the same reference numerals as those in FIG. 3 and FIG. 4 perform the same or similar functions. In such a case, a temperature of the air flowing into the electric heater 57 is a temperature Tci of the radiator 4 which is detected by a radiator temperature sensor 46, and hence Equation (1) mentioned above changes to Equation (4) mentioned below.

$$Thtrest=(Qhtr\times\phi)/(Cpa\times Ga\times SW\times\gamma aTe\times 1.16)+Tci \quad \text{Equation (4)}$$

Furthermore, Equation (2) and Equation (3) mentioned above change to Equation (5) and Equation (6) mentioned below, respectively.

$$ThtrestR=\{(Qhtr/2)\times\phi\}/\{Cpa\times(Ga/2\times SWR)\times\gamma aTe\times 1.16\}+Tci \quad \text{Equation (5), and}$$

$$ThtrestL=\{(Qhtr/2)\times\phi\}/\{Cpa\times(Ga/2\times SWL)\times\gamma aTe\times 1.16\}+Tci \quad \text{Equation (6),}$$

Furthermore, FIG. 6 and FIG. 7 show the example where it is judged that an electric heater temperature sensor 64 fails, but in such a case, a protecting operation is performed at the highest temperature Thtrmax which is represented by Thtrmax=MAX(Thtr1, Thtr2, Thtr3, Thtrest) or Thtrmax=MAX(Thtr1, Thtr2, Thtr3, ThtrestR, ThtrestL) in the same manner as described above.

Thus, also when the radiator 4 is disposed on the upstream side of the air flowing through the air flow passage 3 to the electric heater 57, an estimated value Thtrest of a temperature of the electric heater 57 is accurately calculated on the basis of a consumed power Qhtr and the temperature Tci of the radiator 4 by use of Equation (4) which is a deformation of a general equation $Qhtr\times\phi=(Cpa\times Ga\times SW\times\gamma aTe\times 1.16)\times(Thtrest-Tci)$ indicating a relation between a raised temperature (Thtrest−Tci) in the electric heater 57 and the consumed power Qhtr in this case (this also applies to Equation (5) and Equation (6)).

It is to be noted that in the embodiment, there is provided the radiator temperature sensor 46 which detects the temperature Tci of the radiator 4, but the present invention is not limited to the embodiment, and the estimated value Thest of the temperature of the radiator 4 may be calculated from an operating state of a vehicle air conditioner 1 and/or a temperature or a pressure (a heat absorber temperature Te, a radiator pressure Pci or the like) of another component, and the calculation may be performed by replacing the estimated value Thest with Tci in Equation (4) to Equation (6) mentioned above.

Embodiment 3

Figure 8:
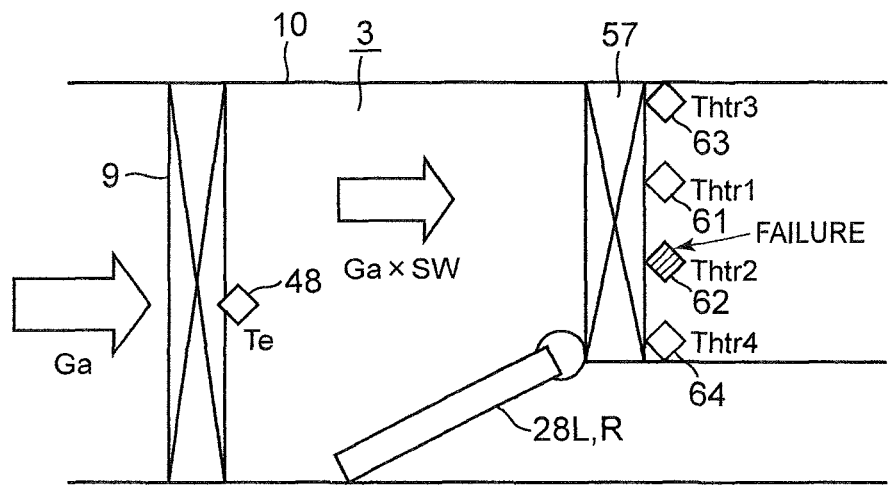
FIG. 8 is a vertical cross-sectional side view of an HVAC unit of a vehicle air conditioner of still another embodiment (Embodiment 3)
Figure 9:
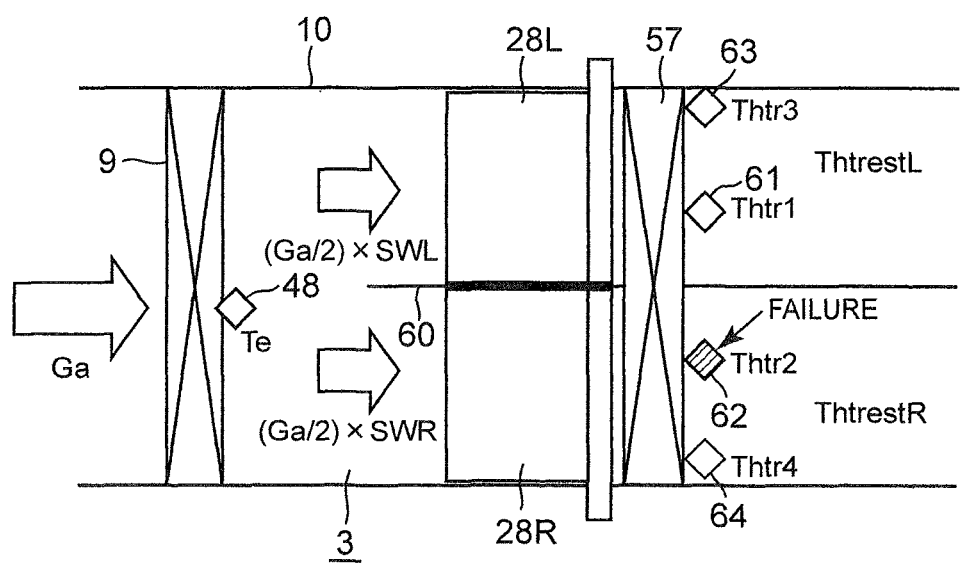
FIG. 9 is a cross-sectional plan view of the HVAC unit of FIG. 8.

Next, FIG. 8 and FIG. 9 show an example where a refrigerant circuit R is used only to cool (dehumidify) air in an air flow passage 3 and heating is performed only by an electric heater 57 in, for example, an electric car or the like. In this case, as shown in the respective drawings, a heat absorber 9 is only disposed in the air flow passage 3, and the electric heater 57 is disposed on an air downstream side of the heat absorber.

In this case, a radiator 4 is not disposed in the air flow passage 3, and hence a temperature of air flowing into the electric heater 57 indicates a temperature Te detected by a heat absorber temperature sensor 48. Therefore, an estimated value Thtrest of the temperature of the electric heater 57 is calculated in the form of Equation (1), Equation (2) or Equation (3) mentioned above.

Furthermore, FIG. 8 and FIG. 9 show the example where it is judged that an electric heater temperature sensor 62 fails, but in such a case, a protecting operation is performed at the highest temperature Thtrmax represented by Thtrmax=MAX(Thtr1, Thtr3, Thtr4, Thtrest) or Thtrmax=MAX(Thtr1, Thtr3, Thtr4, ThtrestR, ThtrestL) in the same manner as described above.

Thus, also when the radiator 4 is not disposed in the air flow passage 3, the temperature Te of the air flowing into the electric heater 57 is added to the temperature of the electric heater 57 itself which is calculated back from a consumed power Qhtr to calculate the estimated value Thtrest of the temperature of the electric heater 57, and hence it is possible to similarly calculate the more accurate estimated value Thtrest of the temperature of the electric heater 57.

It is to be noted that in the above respective embodiments, there has been described the case where the right/left independent air-conditioning control is possible, but in the vehicle air conditioner in which the air flow passage 3 is not divided by the partition plate 60 and which does not have the function of the right/left independent air-conditioning control, the estimated value Thtrest is calculated in accordance with Equation (1) or Equation (4) mentioned above.

Further in the embodiments, the present invention is applied to the vehicle air conditioner 1 having the refrigerant circuit R which changes and executes the respective operation modes of the heating mode, the dehumidifying and heating mode, the dehumidifying and cooling mode and the cooling mode by use of the electric compressor 2, but the present invention is not limited to the embodiments, and in a car driven with an engine, the present invention is also effective in a vehicle air conditioner which performs cooling or dehumidifying by use of a compressor driven with the engine and performs heating by using engine cooling water and by auxiliarily using the electric heater 57. Furthermore, needless to say, the constitution or each numeric value of the refrigerant circuit R which has been described above in the embodiments is not limited to the embodiments, and is changeable without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 20, 21, 22 and 69 solenoid valve
26 suction changing damper
27 indoor blower (blower fan)
28L and 28R air mix damper
32 controller (control means)
46 radiator temperature sensor
48 heat absorber temperature sensor
57 electric heater
60 partition plate
61 to 64 electric heater temperature sensor
R refrigerant circuit

The invention claimed is:

1. A vehicle air conditioner which heats, by an electric heater, air to be supplied to a vehicle interior,
the vehicle air conditioner comprising:
an air flow passage through which the air to be supplied to the vehicle interior flows;
the electric heater disposed in the air flow passage to heat the air to be supplied to the vehicle interior;
a controller that controls energization of the electric heater; and
a plurality of temperature sensors which detect a temperature of the electric heater,
wherein when a detected value of the temperature sensor detecting a highest temperature among the plurality of temperature sensors is in excess of a predetermined threshold value, the controller:
(a) executes at least one of: (i) a first protecting operation limiting the energization to the electric heater and (ii) a second protecting operation stopping the energization to the electric heater, and
(b) calculates an estimated value of the temperature of the electric heater which is calculated back from a consumed power of the electric heater, and
when one of the plurality of temperature sensors fails, the controller executes at least one of the first and second protecting operations on the basis of the highest value among the detected values of the plurality of temperature sensors other than the failed temperature sensor and the estimated value of the temperature of the electric heater.

2. The vehicle air conditioner according to claim 1, wherein the controller executes, in the protecting operation, energization limiting control to limit the energization to the electric heater so that the detected value or the estimated value of the temperature of the electric heater does not exceed a predetermined first threshold value, and energization stop control to stop the energization to the electric heater when the detected value or the estimated value of the temperature of the electric heater is in excess of a predetermined second threshold value higher than the first threshold value.

3. The vehicle air conditioner according to claim 1, comprising a refrigerant circuit having a compressor to compress a refrigerant, a radiator disposed in the air flow passage to let the refrigerant radiate heat and heat the air to be supplied to the vehicle interior, and a heat absorber disposed in the air flow passage on an upstream side of air flowing through the electric heater to let the refrigerant absorb heat and cool the air to be supplied to the vehicle interior,
wherein when the radiator is disposed on a downstream side of the air flowing through the electric heater, the controller calculates the estimated value of the temperature of the electric heater on the basis of the consumed power and a temperature of the heat absorber, and when the radiator is disposed on the upstream side of the air flowing through the electric heater, the controller calculates the estimated value of the temperature of the electric heater on the basis of the consumed power and a temperature of the radiator.

4. The vehicle air conditioner according to claim 1, wherein during the energization to the electric heater, the controller executes a failure diagnosis operation of comparing the estimated value of the temperature of the electric heater with each of the detected values of the plurality of temperature sensors, and judging that any temperature sensor in which a difference between the values is outside a predetermined range fails.

5. The vehicle air conditioner according to claim 1,
wherein during the stop of the energization to the electric heater, the controller executes a failure diagnosis operation of comparing a value of a temperature of the air flowing into the electric heater with each of the detected values of the plurality of temperature sensors, and judging that any temperature sensor in which a difference between the values is outside a predetermined range fails.

6. The vehicle air conditioner according to claim 4,
wherein in the failure diagnosis operation, the controller confirms variances of the detected values of the plurality of temperature sensors at a predetermined timing during the stop of the energization to the electric heater, and the controller judges that the plurality of temperature sensors are normal, when all the detected values are within the predetermined range.

7. The vehicle air conditioner according to claim 1,
wherein when one of the plurality of temperature sensors fails, the controller continues the energization to the electric heater as long as the detected values of the plurality of temperature sensors other than the failed temperature sensor and the estimated value of the temperature of the electric heater are within a predetermined normal range.

8. The vehicle air conditioner according to claim 1,
wherein the controller enables right/left independent air-conditioning control of the vehicle interior, and calculates the estimated values of the temperature of the electric heater independently on right and left sides by use of a right/left air volume ratio.

9. The vehicle air conditioner according to claim 1,
wherein when one of the plurality of temperature sensors fails, the controller decreases the threshold value as much as a predetermined value.

10. The vehicle air conditioner according to claim 1,
wherein when the detected values of the plurality of temperature sensors indicate about the same value during the stop of the energization to the electric heater and the detected value of one of the plurality of temperature sensors indicates a different value with a predetermined difference from the detected values of the other temperature sensors among the plurality of temperature sensors during the energization to the electric heater, the controller judges clogging of the electric heater to stop the energization to the electric heater.

* * * * *